United States Patent
Ferguson et al.

(10) Patent No.: US 10,422,545 B2
(45) Date of Patent: Sep. 24, 2019

(54) HVAC, REFRIGERATION, AND AUTOMATION EQUIPMENT CONTROLLER

(71) Applicant: Lennox Industries Inc., Richardson, TX (US)

(72) Inventors: Charles Thomas Ferguson, Flower Mound, TX (US); Veera Reddy Vemula, McKinney, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 15/874,524

(22) Filed: Jan. 18, 2018

(65) Prior Publication Data

US 2018/0209682 A1 Jul. 26, 2018

Related U.S. Application Data

(60) Provisional application No. 62/448,597, filed on Jan. 20, 2017.

(51) Int. Cl.
*F24F 11/65* (2018.01)
*H04Q 9/00* (2006.01)
(Continued)

(52) U.S. Cl.
CPC .............. *F24F 11/65* (2018.01); *F24F 11/56* (2018.01); *F24F 11/64* (2018.01); *F24F 11/89* (2018.01);
(Continued)

(58) Field of Classification Search
CPC .. F24F 11/56; F24F 11/64; F24F 11/65; F24F 11/89; F24F 2120/10; F24F 11/58; G05B 19/042; G05B 2219/2614; H04Q 9/00; H04Q 2209/00; H04Q 2209/20; H04Q 2209/30; H04Q 2209/40; H04Q 2209/80; H04Q 2209/82; H04Q 2209/823
See application file for complete search history.

(56) References Cited

U.S. PATENT DOCUMENTS 6,211,782 B1   4/2001   Sandelman et al.
7,831,339 B2 * 11/2010   Kim ....................... F24F 11/006
                                                340/3.32
(Continued)

OTHER PUBLICATIONS

Extended European Search Report, Application No. 18152604.7, dated Aug. 8, 2018, 6 pages.

*Primary Examiner* — Franklin D Balseca
(74) *Attorney, Agent, or Firm* — Baker Botts L.L.P.

(57) ABSTRACT

A system includes one or more systems, a controller and a server. The one or more systems including one or more heating, ventilation, and air conditioning (HVAC) systems, refrigeration systems, or building automation systems. The controller is communicatively coupled to the one or more systems. The server is communicatively coupled to the controller. The controller receives telemetry data associated with the operation of the one or more systems. The received telemetry data includes data associated with individual components of the one or more systems. The controller also determines a subset of the telemetry data that has changed by comparing the received telemetry data to previous telemetry data. The controller also communicates to the server only the subset of the telemetry data that has changed.

20 Claims, 5 Drawing Sheets

(51) Int. Cl.
    *G05B 19/042*     (2006.01)
    *F24F 11/64*     (2018.01)
    *F24F 11/89*     (2018.01)
    *F24F 11/56*     (2018.01)
    *F24F 120/10*     (2018.01)
    *F24F 11/58*     (2018.01)

(52) U.S. Cl.
    CPC ............ G05B 19/042 (2013.01); H04Q 9/00 (2013.01); *F24F 11/58* (2018.01); *F24F 2120/10* (2018.01); *G05B 2219/2614* (2013.01); *H04Q 2209/00* (2013.01); *H04Q 2209/20* (2013.01); *H04Q 2209/40* (2013.01); *H04Q 2209/80* (2013.01); *H04Q 2209/823* (2013.01)

(56) References Cited

U.S. PATENT DOCUMENTS

| | | | |
|---|---|---|---|
| 9,397,521 B2 * | 7/2016 | Wester | G05F 5/00 |
| 9,622,103 B2 * | 4/2017 | Suzuki | H04W 16/00 |
| 2004/0088069 A1 | 5/2004 | Singh | |
| 2006/0232438 A1 * | 10/2006 | Golla | E21B 47/18 |
| | | | 340/855.3 |
| 2014/0266755 A1 | 9/2014 | Arensmeier et al. | |
| 2016/0041565 A1 * | 2/2016 | Edwards | E03C 1/00 |
| | | | 700/282 |
| 2016/0092501 A1 * | 3/2016 | Chakraborty | G06F 17/30592 |
| | | | 706/46 |
| 2016/0102877 A1 | 4/2016 | Griffin et al. | |
| 2016/0215996 A1 | 7/2016 | Blair et al. | |
| 2017/0192400 A1 * | 7/2017 | Hofschulz | G05B 15/02 |
| 2017/0374490 A1 * | 12/2017 | Schoppmeier | H04L 67/12 |

* cited by examiner

Telemetry Data

| HVAC System | Refrigeration System | Automation System |
|---|---|---|
| On/Off | On/Off | Light 1: On/Off |
| Partial Load | Temp Set Point | Light 2: On/Off |
| Temp Set Point | Total Power | Security Lock: Engaged |
| Total Power | | |
| Compressor 1: On/Off | Compressor 1: On/Off | Occupancy Sensor 1 |
| Compressor 1 Temp | Compressor 1 Temp | ... |
| Internal Sensor 1 Temp | Refrigerant Sensor 1 Temp | Space Temp Sensor 1 |
| Internal Sensor 1 Pressure | Refrigerant Sensor 1 Pressure | Outside Temp Sensor |
| Component 1 Power Usage | Fan 1: On/Off | Equipment 1 Power |
| ... | ... | ... |

| HVAC System | Received Telemetry | Previous Telemetry | Communicated Telemetry EX 1 | Communicated Telemetry EX 2 |
|---|---|---|---|---|
| On/Off | ON | ON | - | - |
| Partial Load | OFF | OFF | - | - |
| Temp Set Point | 72° F | 72° F | - | - |
| Total Power | 900W | 800W | 900W | 100 |
| Compressor 1: On/Off | ON | ON | - | - |
| Compressor 2: On/Off | ON | ON | - | - |
| Compressor 3: On/Off | OFF | ON | ON | 1 |
| Compressor 4: On/Off | OFF | ON | ON | 1 |
| Internal Sensor 1 Temp | 0° F | 5° F | 0° F | -5 |
| Internal Sensor 2 Temp | 40° F | 46° F | 40° F | -6 |
| Internal Sensor 1 Pressure | 35 PSI | 30 PSI | 35 PSI | 5 |
| Compressor 3 Power | 150W | 15W | 150W | 135 |
| Fan 1 Power | 50W | 35W | 50W | 15 |

FIGURE 4

HVAC, REFRIGERATION, AND AUTOMATION EQUIPMENT CONTROLLER

RELATED APPLICATIONS

This application claims priority to and the benefit of U.S. Provisional Patent Application No. 62/448,597, filed Jan. 20, 2017 and entitled "HVAC AND AUTOMATION EQUIPMENT CONTROLLER," the contents of which are herein incorporated by reference in their entirety.

TECHNICAL FIELD

Certain embodiments of this disclosure relate generally to systems including one or more heating, ventilation, and air conditioning (HVAC) systems, refrigeration systems, or automation systems generating telemetry data, and more specifically, to managing the generated telemetry data, which may be used to control one or more components of the systems.

BACKGROUND

Buildings and other structures often utilize equipment to provide an optimal environment. A number of devices and equipment may be placed within a building to provide heating, cooling, lighting, airflow, refrigeration, energy monitoring, among other desired functions. For example, a building may include one or more of a heating, ventilation, and air conditioning (HVAC) system, a refrigeration system, and an automation system. HVAC systems may provide heating and cooling to a space within the building. Refrigeration systems can be used to refrigerate particular spaces within the building, such as within refrigerators, display cases, and walk-in coolers. Automation systems may control lights, fans, or other powered equipment within the building. Each system may be managed separately by an operator of the building.

SUMMARY OF THE DISCLOSURE

According to one embodiment, a system includes one or more systems, a controller and a server. The one or more systems including one or more heating, ventilation, and air conditioning (HVAC) systems, refrigeration systems, or building automation systems. The controller is communicatively coupled to the one or more systems. The server is communicatively coupled to the controller. The controller receives telemetry data associated with the operation of the one or more systems. The received telemetry data includes data associated with the internal operation of individual components of the one or more systems. The controller also determines a subset of the telemetry data that has changed by comparing the received telemetry data to previous telemetry data. The controller also communicates to the server only the subset of the telemetry data that has changed.

In particular embodiments, the controller is further configured to receive the telemetry data from each of the one or more systems according to respective protocols used by the one or more systems. The controller is further configured to communicate the subset of the telemetry data to the server according to a different protocol that is used by the server.

In particular embodiments, to communicate the subset of the telemetry data to the server, the controller is further configured to communicate at least a portion of the telemetry data in the form of a delta representing the difference between the previous telemetry data and the received telemetry data.

In particular embodiments, to communicate the subset of the telemetry data, the controller is further configured to communicate at least a portion of the telemetry data in the form of an actual value of the received telemetry data.

In particular embodiments, the controller is further configured to determine whether a change indicated by a portion of the received telemetry data exceeds a predetermined threshold. In response to determining that the change exceeds the predetermined threshold, the controller is configured to include the portion of the received telemetry data in the subset of the telemetry data that has changed. In response to determining that the change does not exceed the predetermined threshold, the controller is configured to exclude the portion of the received telemetry data from the subset of the telemetry data that has changed.

In particular embodiments, to determine the subset of the telemetry data that has changed, the controller is further configured to compare the received telemetry data and a most recent of the previous telemetry data.

According to another embodiment, a controller configured to communicatively couple to one or more systems. At least one of the one or more systems includes a heating, ventilation, and air conditioning (HVAC) system, a refrigeration system, or a building automation system. The controller is further configured to receive telemetry data associated with the operation of the one or more systems. The controller is further configured to determine a subset of the telemetry data that has changed by comparing the received telemetry data to previous telemetry data. The controller is further configured to communicate to a server only the subset of the telemetry data that has changed.

In particular embodiments, the received telemetry data comprises data associated with individual components of the one or more systems.

In particular embodiments, the controller is further configured to receive the telemetry data from each of the one or more systems according to respective protocols used by the one or more systems. The controller is further configured to communicate the subset of the telemetry data to the server according to a different protocol that is used by the server.

In particular embodiments, to communicate the subset of the telemetry data to the server, the controller is further configured to communicate at least a portion of the telemetry data in the form of a delta representing the difference between the previous telemetry data and the received telemetry data.

In particular embodiments, to communicate the subset of the telemetry data, the controller is further configured to communicate at least a portion of the telemetry data in the form of an actual value of the received telemetry data.

In particular embodiments, the controller is further configured to determine whether a change indicated by a portion of the received telemetry data exceeds a predetermined threshold. In response to determining that the change exceeds the predetermined threshold, the controller is further configured to include the portion of the received telemetry data in the subset of the telemetry data that has changed. In response to determining that the change does not exceed the predetermined threshold, the controller is further configured to exclude the portion of the received telemetry data from the subset of the telemetry data that has changed.

In particular embodiments, to determine the subset of the telemetry data that has changed, the controller is further configured to compare the received telemetry data and a most recent of the previous telemetry data.

According to yet another embodiments, a method includes receiving telemetry data associated with the operation of the one or more systems. At least one of the one or more systems includes a heating, ventilation, and air conditioning (HVAC) system, a refrigeration system, or a building automation system. The method further includes determining a subset of the telemetry data that has changed by comparing the received telemetry data to previous telemetry data. The method further includes communicating to a server only the subset of the telemetry data that has changed.

In particular embodiments, the received telemetry data includes data associated with individual components of the one or more systems.

In particular embodiments, the method further includes receiving the telemetry data from each of the one or more systems according to respective protocols used by the one or more systems. The method further includes communicating the subset of the telemetry data to the server according to a different protocol that is used by the server.

In particular embodiments, communicating the subset of the telemetry data to the server includes communicating at least a portion of the telemetry data in the form of a delta representing the difference between the previous telemetry data and the received telemetry data.

In particular embodiments, communicating the subset of the telemetry data to the server includes communicating at least a portion of the telemetry data in the form of an actual value of the received telemetry data.

In particular embodiments, the method further includes determining whether a change indicated by a portion of the received telemetry data exceeds a predetermined threshold. In response to determining that the change exceeds the predetermined threshold, the method further includes including the portion of the received telemetry data in the subset of the telemetry data that has changed. In response to determining that the change does not exceed the predetermined threshold, the method further includes excluding the portion of the received telemetry data from the subset of the telemetry data that has changed.

In particular embodiments, determining the subset of the telemetry data that has changed includes comparing the received telemetry data and a most recent of the previous telemetry data.

Certain embodiments may provide one or more technical advantages. For example, certain embodiments may reduce the amount of telemetry data communicated by only communicating telemetry data that has changed. In this manner, less bandwidth is needed and additional telemetry data values may be monitored and communicated, which may enhance the monitoring and control of various individual systems from a centralized location. As another example, certain embodiments may receive the telemetry data that includes data associated with individual components of one or more HVAC, refrigeration, and/or automation systems. This increased transparency into these systems may enhance the type of analysis and control of each individual type of system and the combination of telemetry data across different types of systems may allow for synergistic analysis and control of the different systems. As yet another example, certain embodiments may further reduce the amount of telemetry data communicated by only communicating changes in the telemetry data that are above a predetermined threshold. Reducing the amount of data may reduce latencies in communicating the data to the server and may reduce the processing load on the server. Reduced latencies and/or reduced load on the server may allow for better responsiveness and the ability to assess the operation of the HVAC, refrigeration, and/or automation systems more quickly. For example, this may lead to more efficient control of the HVAC, refrigeration, and/or automation systems by identifying and resolving problems more quickly. In this manner, only impactful changes may be communicated and normal variations are excluded.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 3 is an example array of telemetry data that may be generated by the example system, according to certain embodiments;

FIG. 4 is an example array of one type of telemetry data that may be generated at an HVAC system and examples of subsets telemetry data that may be communicated to the server, according to certain embodiments.

DETAILED DESCRIPTION

Figure 1:
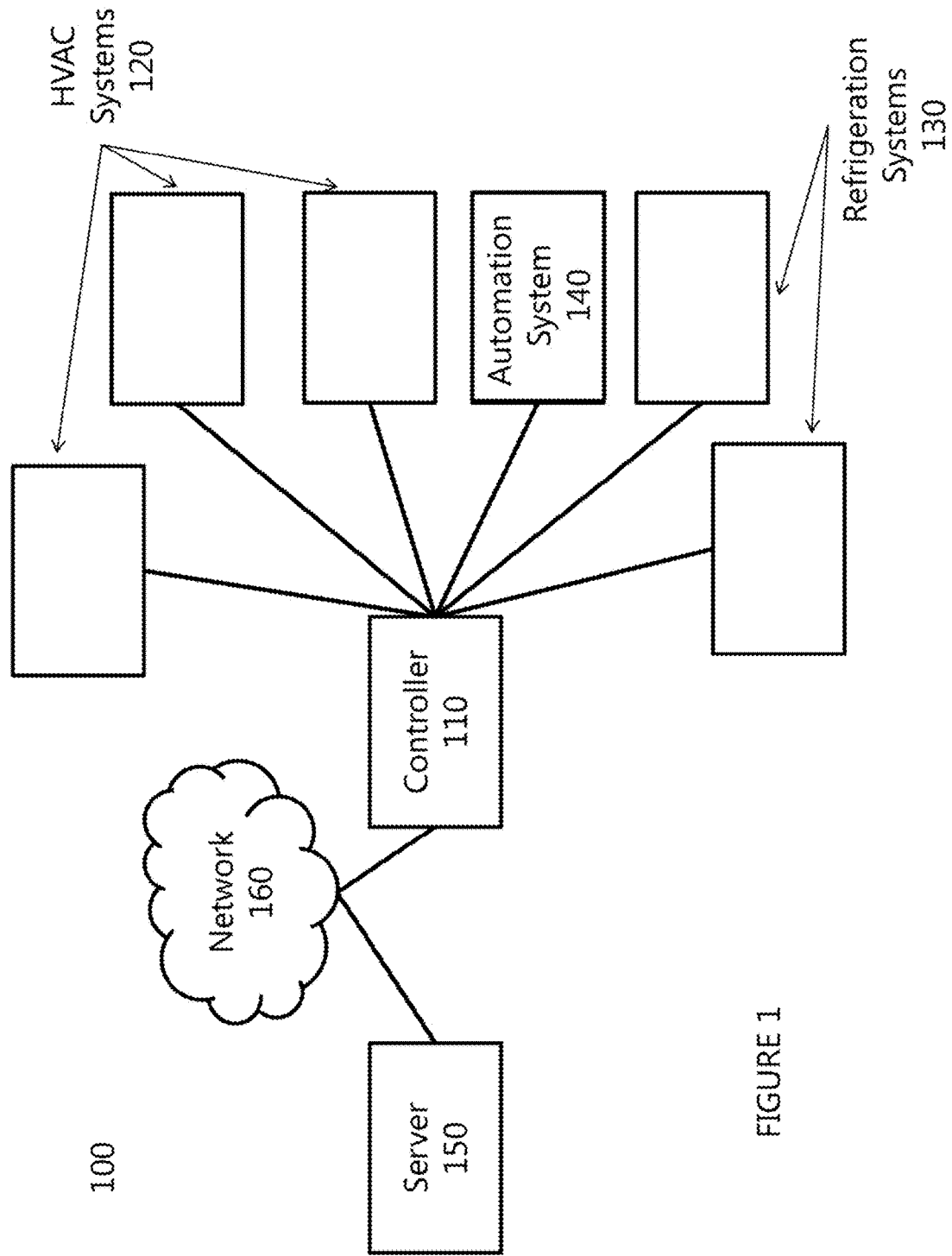
FIG. 1 illustrates an example system including one or more of a heating, ventilation, and air conditioning (HVAC) system, a refrigeration system, or an automation system, according to certain embodiments.

Embodiments of the present disclosure and its advantages are best understood by referring to FIGS. 1 through 5 of the drawings, like numerals being used for like and corresponding parts of the various drawings.

Buildings, sites, or other spaces may include one or more systems, including one or more of a heating, ventilation, and air conditioning (HVAC) system, a refrigeration system, or an automation system. Each system may generate its own telemetry data. Examples of telemetry data may include measurements and status indicators at those systems, which may be transmitted to equipment management systems for monitoring and/or control of those systems at a remote location. Conventional systems only generate and communicate basic telemetry data, such as whether a particular system is on or off, what mode the system is running on, currently configured setpoints, and/or the total power consumed. This basic telemetry data is of limited use and due to its relative simplicity, may be transmitted using conventional protocols that are suitable to transmit the small amount of data generated at these systems. However, each of these systems may include internal components and sensors, which are not being monitored outside of internal controllers of those individual systems. If accessible, this information may be used to more closely monitor and understand the operation of those respective systems. Furthermore, when more than one of these systems are in close proximity or present at the same site, the operation of each system may affect the performance of the other. In this manner, conventional use of telemetry data from these systems provides limited benefits when the telemetry data is so limited and data from each system is siloed to its respective controller.

In contrast, enhanced telemetry data, including data from internal components and sensors, may be used in a variety of ways, including measuring the performance of individual components of each system, predicting maintenance of systems, optimizing the operation of each system individually and in combination with other systems, and controlling each system with finer detail.

Although the benefits of generating and communicating this additional telemetry data is clear, it presents unresolved problems that are addressed herein. For example, the generating and communicating the additional telemetry data greatly increases the amount of data that must be transferred to the equipment management system. In order to provide the necessary granularity to provide the additional benefits of monitoring this additional telemetry data, the telemetry data must be updated regularly, with some data values optimally updated every minute, or even more regularly. As another example, while basic telemetry data may be communicated on open protocols given its relatively simple nature, the additional telemetry data is often gated by protocols internal to the particular system. Accordingly, any management system attempting to use the additional telemetry data must first have access to it. Further, to benefit from the potentially synergistic effects of having additional telemetry data from multiple types of systems, the management system must be able to interact and access the telemetry data from each type of system. This disclosure contemplates systems and methods that may provide an efficient solution to controlling, scheduling, and maintaining the various pieces of equipment that are installed in a particular space by accessing telemetry data generated at each system and compressing it for further communication.

FIG. 1 illustrates an example system 100 including one or more heating, ventilation, and air conditioning (HVAC) systems 120, refrigeration systems 130, and an automation system 140, according to certain embodiments. Each of the HVAC systems 120, refrigeration systems 130 and automation system 140 may be configured to have a variety of HVAC, refrigeration, and automation equipment with different functions and capabilities. For example, each HVAC system 120 may include one or more HVAC units serving different areas of a building. Similarly, each refrigeration system 130 may include one or more refrigeration units at different locations at a site or within a building. Likewise, automation system 140 may include control systems for dozens of light fixtures, security systems, and monitoring sensors spread across multiple floors and rooms of one or more buildings.

HVAC systems 120 may be controlled by the controller 110 and/or server 150 based on temperature set points and/or the occupancy of a space covered by the HVAC systems 120. Server 150 may be used to set a schedule for the operation of the HVAC equipment 120 which may include the changing of settings, such as temperature set points and occupancy settings, based on the date, day of the week, time of day, or other characteristics. Example of HVAC equipment that may be present in HVAC systems 120 may include, but are not limited to, air conditioners, heaters, condensing units, ventilation units, window units, wall units, and air filtration systems. HVAC systems 120 may also include blowers and fans, including any type of blower or fan for moving a volume of air or gas.

A space may also include refrigeration systems 130, which may also be controlled through controller 110 and/or server 150. Refrigeration systems 130 may include one or more coolers, freezers, refrigeration cases, etc., which may provide a more localized environmental control to specific spaces within a building. Examples of refrigeration equipment that may be present in refrigeration systems 130 may include, but are not limited to, reach-in refrigerators, reach-in freezers, merchandising refrigerators, merchandising freezers, walk-in refrigerators, walk-in freezers, commercial refrigerators, and commercial freezers.

A space may also include automation system 140, which can be automated and/or controlled based on certain conditions. Such automation equipment 130 may include lights, kitchen equipment, sensors, door locks, or any other devices that may be controlled and/or operated. The controller 110 and/or server 150 may operate to set a schedule for the operation of the automation systems 140 which may include the changing of settings, such as temperature set points and occupancy settings, based on the date, day of the week, time of day, or other characteristics. Controller 110 and/or Server 150 may operate to communicate alerts based on information received by HVAC systems 120, refrigeration systems 130, and/or automation equipment 140.

Each of HVAC systems 120, refrigeration systems 130 and automation system 140 may include components such as sensors and switches that work with the functional portions of each system to sense the conditions within each system and control its operation. Examples of sensors include, but are not limited to, temperature sensors, humidity sensors, light sensors, occupancy sensors, motion sensors, proximity sensors, sound sensors, touch sensors, and pressure sensors. Examples of switches include, but are not limited to, pressure switches, toggle switches, mechanical switches, electronic switches, mercury tilt switches, touch switches, push button switches, rotary switches, and momentary switches. Each sensor and/or switch may generate telemetry data, which may be communicated to controller 110.

Controller 110 may be communicatively coupled to one or more of HVAC systems 120, refrigeration systems 130, and automation system 140. For example, controller 110 may be local to the building at which each of HVAC systems 120, refrigeration systems 130, and automation system 140 is located, or may be remote to the location of the building, but coupled to one or more of the systems through a communication link or links. As described in further detail below, controller 110 may be configured to receive data from each of HVAC systems 120, refrigeration systems 130, and automation system 140. In this manner, controller may receive telemetry data from each system, which may be used at controller 110 and/or at server 150 to monitor and control the operation of each of HVAC systems 120, refrigeration systems 130, and automation system 140.

Server 150 may receive data from controller 110. This data may include telemetry data associated with the operation of the equipment in HVAC systems 120, refrigeration systems 130, and automation system 140. In certain embodiments, system 100 further includes network 160. Network 160 may be any communications network, such as a private network, a public network, a connection through the internet, a mobile network, a WI-FI network, etc. Controller 110 and server 150 may communicate over network 160, including communicating telemetry data from controller 110 to server 150 and operational instructions from server 150 to controller 110. Telemetry data generated at each respective system may reflect a variety of measurements and/or operational characteristics of each system, including the operation of individual components within each system. The telemetry data may also reflect internal measurements within the components of each system. Certain examples of telemetry data are further described below in reference to FIG. 3.

In certain embodiments, controller 110 may only communicate a subset of the telemetry data to server 150 reflecting changes to the telemetry data. For example, controller 110 may be configured to receive additional telemetry data by using internal protocols specific to each system to receive more detailed information gathered about individual components and sensing internal to each system. Controller 110 may process the received telemetry data to reduce the amount of data sent to server 150 and may also process the received telemetry data to communicate the telemetry data on a compatible protocol to server 150.

Figure 2:
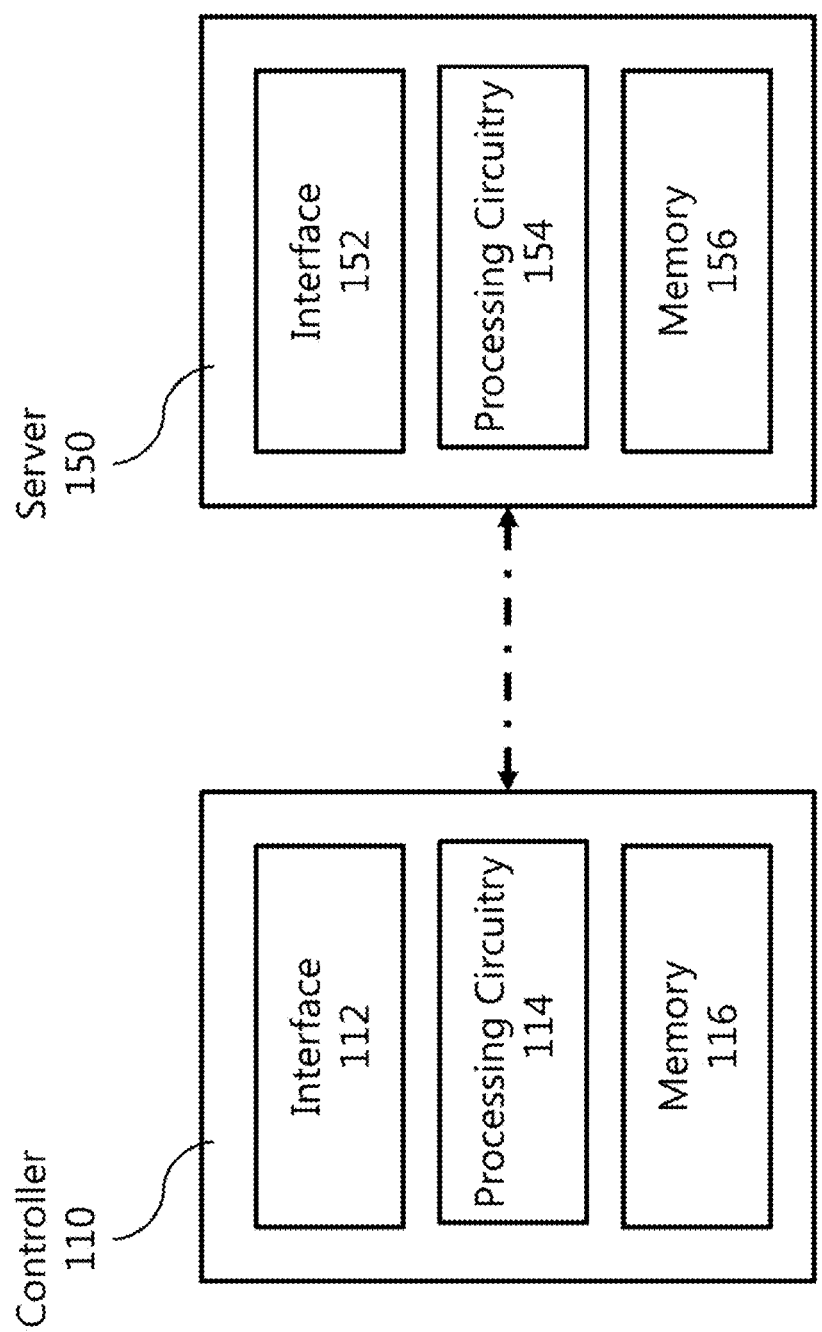
FIG. 2 illustrates an example a controller and server connected to the system, according to some embodiments.

FIG. 2 illustrates an example controller and server connected to a system having HVAC systems 120, refrigeration systems 130, and/or automation equipment 140 such as controller 110 and server 150 of system 100 described with respect to FIG. 1, in accordance with certain embodiments. In certain embodiments, controller 110 may include a thermostat or may be in communication with a thermostat. Controller 110 includes one or more interface(s) 112, processing circuitry 114, and memory 116.

In some embodiments, interface 112 facilitates communicating signals to/from HVAC systems 120, refrigeration systems 130, and/or automation equipment 140. Processing circuitry 114 executes instructions to provide some or all of the control functionality for the HVAC systems 120, refrigeration systems 130, and/or automation equipment 140. Processing circuitry 114 may process data received from HVAC systems 120, refrigeration systems 130, and/or automation equipment 140. Memory 116 stores the instructions for execution by processing circuitry 114 and any other suitable type of data such as data received HVAC systems 120, refrigeration systems 130, and/or automation equipment 140. As an example, processing circuitry 114 may determine a heating set point based on an input received from interface 112, determine to turn components of the HVAC systems 120, refrigeration systems 130, and/or automation equipment 140 on or off based on instructions and/or configuration settings stored in memory 116, and communicate signals via interface 112 to cause the components of the HVAC systems 120, refrigeration systems 130, and/or automation equipment 140 to turn on or off, for example, in order to reach the set point. Processing circuitry 114 may generate alerts to indicate that one or more pieces of equipment is not performing within a predetermined threshold.

Interface 112 may comprise a wired or wireless interface and may be configured to communicate with components of the HVAC systems 120, refrigeration systems 130, and/or automation equipment 140 through any suitable network. Processing circuitry 114 may include any suitable combination of hardware and software implemented in one or more modules to execute instructions and manipulate data to perform some or all of the described functions. In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic.

In certain embodiments, interface 112 includes a plurality of interfaces that are configured to communicate with one or more protocols of the HVAC systems 120, refrigeration systems 130, and/or automation equipment 140. For example, each type of system may use a different protocol for transmitting telemetry data. In some examples, interface 112 may include interfaces that are configured to receive information from each type of system using the internal protocols used by each respective system. In this manner, interface 112 may receive telemetry data that had previously not been available outside of the individual system. In some embodiments, interface 112 may include a further interface to communicate with server 150 using a different protocol used to receive telemetry data from one or more of HVAC systems 120, refrigeration systems 130, and/or automation equipment 140. In this manner, controller 110 may relay the useful telemetry data to server 150 without server 150 being configured to receive information from each respective system that may use a separate protocol. Further, server 150 may also receive information about different types of systems over a transmission from a single location, e.g., controller 110.

Memory 116 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of server 110.

Server 150 may include one or more interface(s) 152, processing circuitry 154, and memory 156. In some embodiments, interface 152 facilitates communicating signals to/from controller 110. For example, interface 152 may communicate with controller 110 over a network. In some examples, interface 152 may provide a direct connection between server 150 and 110 without an intervening network. Server 150 may include processing circuitry 154 that executes instructions to provide some or all of the control functionality for the HVAC systems 120, refrigeration systems 130, and/or automation equipment 140. For example, processing circuitry 154 may execute instructions to process telemetry data received from HVAC systems 120, refrigeration systems 130, and/or automation equipment 140. The processed telemetry data may be used to determine operational commands for each system and to monitor the performance of each system. Server 150 may include memory 156 operable to store instructions, such as a computer program, software, and/or an application including one or more of logic, rules, algorithms, code, tables, etc.

Other embodiments of controller 110 and/or server 150 may include additional components beyond those shown in FIG. 2 that may be responsible for providing certain aspects of controller 110 or server 150's functionality, including any of the functionality described above and/or any additional functionality (including any functionality necessary to support the solution described above). As just one example, controller 110 may include input devices and output devices. Input devices include mechanisms for entry of data into controller 110. For example, input devices may include input mechanisms, such as a microphone, input elements, a display, a keyboard, etc. Output devices may include mechanisms for outputting data in audio, video, and/or hard copy format. For example, output devices may include a speaker, a display, etc. Input devices and output devices may be provided at controller 110 in order to provide communication between controller 110 and HVAC systems 120, refrigeration systems 130, and/or automation equipment 140.

While server 150 and controller 110 have been described as separate apparatus, in certain embodiments, one or more features or functions of server 150 may be integrated into controller 110 and vice versa. For example, controller 110 may be configured to process telemetry data to determine operational commands to control HVAC systems 120, refrigeration systems 130, and/or automation equipment 140. In some embodiments, controller 110 may be distributed over a plurality of controlling modules located at different portions of a building having HVAC systems 120, refrigeration systems 130, and/or automation equipment 140.

FIG. 3 is an example array 300 of telemetry data that may be generated by system 100, according to certain embodiments. HVAC systems 120, refrigeration systems 130, and/or automation equipment 140 may generate data through measurements of certain values in or around each system, including measurements at one or more sensors. Sensors may include discrete sensors and/or analog sensors. Discrete sensors are generally binary sensors. For example, a discrete sensor may indicate whether equipment is on or off, whether a door is open or shut, or any other type of discrete data. Analog sensors, however, generally collect continuous data that is not discrete. For example, an HVAC systems 120 may include temperature sensor that measures the temperature of a refrigerant at a supply temperature and/or a return temperature over a continuous range of temperatures. Much of this data had conventionally been siloed inside the individual system and its internal controls. As such, this data was not generated as telemetry data for further transmission outside of each system.

In some embodiments, the only telemetry data available from HVAC systems 120, refrigeration systems 130, and/or automation equipment 140 is basic telemetry data 310. As shown in array 300, basic telemetry data 310 may be limited to basic indications whether a certain system is on or off, the mode the system is running in, target set points, overall power consumption, and whether certain equipment is on or off. While basic telemetry data 310 may be useful, it fails to provide insight into the operation of individual components of each of HVAC systems 120, refrigeration systems 130, and/or automation equipment 140, which may affect the optimal performance settings and operation of each system.

As discussed above, controller 110 may be configured to interface with each type of system allowing the transmission of additional telemetry data that is conventionally limited to internal controlling of the system. For example, certain embodiments of controller 110 may receive additional telemetry data, an example of which is enhanced telemetry data 320 in array 300. As shown in FIG. 3, enhanced telemetry data 320 may include additional telemetry data that is associated with individual components of HVAC systems 120, refrigeration systems 130, and/or automation equipment 140. Each type of system may generate different types of enhanced telemetry data 320. For example, HVAC systems 120 may generate telemetry data that indicates the on/off status and temperatures at each compressor. In this manner, enhanced telemetry data 320 may be used to isolate poor performance of HVAC systems 120 or consider the optimal performance based on the number of compressors running in particular circumstances. Similarly, refrigeration systems 130 may generate additional data that may be included in enhanced telemetry data, such as the temperatures and pressures of one or more refrigerant at one or more cooling cycles. Likewise, automation systems 140 may generate data that may be included in enhanced telemetry data 320, such as the individual power usage of various pieces of equipment or occupancy sensing data. In this manner, enhanced telemetry data 320 may augment basic telemetry data 310 to provide more granular detail about the operation of each system, which may then be used to monitor and control the systems more effectively.

In certain embodiments, telemetry data is communicated continuously to controller 110. When the telemetry data only includes basic telemetry data 310, such communications are not overly onerous. The addition of enhanced telemetry data 320, however, presents several technical challenges. For example, continuously communicating data may require a relatively large amount of network bandwidth. As another example, server 150 may be required to process the data as it is received from controller 110, requiring a relatively large amount of processor usage. This disclosure contemplates the technical advantage of reducing the amount of telemetry data sent to server 150 by communicating a subset of the telemetry data to server 150 that has changed allowing the equipment to communicate a smaller amount of data. Communicating a smaller amount of data reduces network bandwidth requirements and processing requirements.

In certain embodiments, controller 110 may receive all of the telemetry data and then determine a subset of the telemetry data that has changed by comparing the received telemetry data to previous telemetry data. Controller 110 may then communicate to server 150 only that subset of the telemetry data that has changed. In this manner, controller 110 not only may interpret and gather telemetry data from different types of systems, but may also significantly curtail the amount of information that needs to be sent to server 150. Examples of different types of compression approaches are further described below in reference to FIG. 4.

In certain embodiments, controller 110 may transmit the entire subset of telemetry data that has changed at each instance of transmission. For example, for each value that changed, controller 110 may transmit all changed values on a continuous basis. In some embodiments, the equipment may communicate the changed telemetry data to server 110 in batches. For example, the equipment may communicate the telemetry data every five minutes, every sixty minutes, or any other suitable period of time. In some embodiments, controller 110 transmits different values of telemetry data at different periods. For example, temperature and pressures of HVAC systems 120 may be transmitted every second, but whether an individual compressor is running may be transmitted only every minute. In this manner, controller 110 may further reduce the amount of telemetry data transmitted to server 150 by prioritizing what data may be sent most frequently.

Controller 110 may further control the telemetry data communicated to server 150 based on the parameters or values that have changed. In certain embodiments controller 110 may monitor how frequently a given parameter changes and based on that observed frequency, determine a reporting frequency for reporting that parameter. For example, controller 110 may determine that certain temperature values typically have a sustained change every five minutes. Controller 110 may then set a timer or some other mechanism that triggers the inclusion of that parameter in its communication of telemetry data to the server every five minutes or some other period of time based on that frequency. In some embodiments, the frequency in which a parameter is reported may be based on its importance to the control of the respective system. For example, whether the security locks are engaged may only be important during certain periods of the day and may only be reported regularly during those periods. In some embodiments, controller 100 may monitor the load of communications downstream from controller, such as the network 160 and/or server 150 traffic load. In response, controller 110 may adjust its frequency for reporting one or more telemetry data parameters. For example, controller 110 may adjust a timer to report the parameters more frequently, e.g., adjust the timer for a shorter period, when controller 110 determines that there is less traffic on network 160 and/or at server 150. In this manner, controller may make several adjustments to its communication of telemetry data to reduce the load on server 150 and/or network 160.

FIG. 4 is an example array 400 of one type of telemetry data that may be generated at HVAC system 120 and examples of subsets 405 and 410 of telemetry data that may be communicated to server 150, according to certain embodiments. Array 400 illustrates two different methods of determining the subset of telemetry data at controller 110 to send to server 150. While these two examples will be discussed in detail below, the disclosure herein contemplates any suitable method for determining changes in the telemetry data in order to communicate only the subset of telemetry data that has changed.

Array 400 illustrates an example set of telemetry data from one of HVAC systems 120. The second column is an example set of data received at controller 110 at a present time. As depicted, the received telemetry data includes both basic telemetry data 310 and enhanced telemetry data 320 as discussed above. The received telemetry data includes measurements at both analog and discrete sensing units. For example, the received telemetry data includes on/off status of various compressors and also temperature, pressure, and power measurements at various components within HVAC system 120. In some embodiments, controller retains or has available to it the previously communicated telemetry data. The third column includes an example set of previous telemetry data that includes the same data points as the received telemetry data. These columns may not always include the same data points. For example, some telemetry data may be reported at a different frequency or may not be reported at all if there is not a change in the value.

In certain embodiments, controller 110 may determine the subset of telemetry data that has changed by comparing the received telemetry data to previously received telemetry data. For example, controller may compare the received telemetry data to the most recently received telemetry data. As shown in array 400, subsets 405 and 410 may be generated by comparing the received telemetry data and previous telemetry data columns. Controller 110 may do this in a variety of ways, two examples of which are discussed herein.

In a first example, controller 110 may generate subset 405 based on the example telemetry data in array 400 and communicate subset 405 to server 150. In certain embodiments, controller 110 may communicate at least a portion of the telemetry data in the form of an actual value of the received telemetry data. As shown in array 400, only certain values in the telemetry data have changed when compared with the previous telemetry data. For those values, controller 110 may exclude those from subset 405 since they have not changed. As a result those values would be excluded from the communication with server 150. However, some values of the telemetry data have changed. In some embodiments, controller 110 may communicate those received values that have changed compared to the previous telemetry data. For example, because the total power, compressor 3 and 4's on/off status, and several temperature and pressure measurements have changed, controller 110 may include those changed values in subset 405 to be communicated to server 150. In this manner, server 150 may receive the actual values of the telemetry data, with which it may replace the previously communicated values and/or further process.

In a second example, controller 110 may generate subset 410 based on the example telemetry data in array 400 and communicate subset 410 to server 150. In certain embodiments, controller 110 may communicate at least a portion of the telemetry data in the form of a delta representing the difference between the previous telemetry data and the received telemetry data. Using the same example received and previous telemetry data, controller 110 may generate a different subset 410 to communicate to server 150. Subset 410 differs from subset 405 by not including the actual value for that telemetry data point, but instead indicated a difference, e.g., a delta, between a previous telemetry data value and the received telemetry data value. Positive deltas may be indicated by a positive value and negative deltas may be indicated by a negative delta. Server 150 may use subset 410 to update its telemetry data information by merely adding those values to its previously stored values to generate the current actual value. Deltas may also be more efficient for use at server 150 based on the configuration of the processing and/or analysis upon the telemetry data. Accordingly, various subsets of telemetry data may be determined at controller 110 for communication to server 150.

In certain embodiments, values of telemetry data may be further excluded from subsets 405 and/or 410 based on predetermined thresholds. In some embodiments, controller 110 may exclude values that changed less than the predetermined threshold for that particular value. For example, controller 110 may be configured to not communicate each change detected by an analog sensor when the change is small, such as a change in a temperature of only one half of one degree. In such instances, controller 110 may be configured to determine whether a change in a portion of the received telemetry data exceeds a predetermined threshold. If controller 110 determines the change exceed the threshold, controller 110 may include the changed portion in the subset of telemetry data communicated to server 150. If controller 110 determines the change does not exceed the threshold, controller 110 may exclude the changed portion in the subset of telemetry data communicated to server 150. The predetermined thresholds may be any suitable threshold for the telemetry data. For example, predetermined thresholds may be specific to certain values of the telemetry data, may be an absolute value change threshold, or may represent a percentage change. In this manner, controller 110 may further reduce the amount of data communicated to server 150 and limit it to telemetry data that may represent a noticeable effect on the operation of the systems.

In certain embodiments, controller 110 may use a timer to determine whether a change in one or more parameters in the telemetry data has persisted for at least a minimum amount of time. If the change is not persistent, controller 110 may exclude that telemetry data from the subset of telemetry data communicated to server 150. If the change has persisted beyond the timer's period, then it may be included. As a result, controller 110 may avoid sending telemetry data that merely reflects a transient change of one or more parameters of the monitored systems.

In certain embodiments, controller 110 and/or server 150 may assume that the state or condition associated with a piece of equipment is unchanged unless controller 110 and/or server 150 receives a telemetry data indicating a change in the state or condition associated with an equipment. Thus, one or more of controller 110 and server 150 maintains current information for the equipment while receiving a smaller amount of data. In some embodiments, server 150 may reconstruct the entire set of telemetry data received at controller 110 based on the communicated data from controller 110. For example, server 150 may retain the previous state of the systems and update those parameters based on the subset of telemetry data from controller 110. Thus, server 150 may reconstruct the entire telemetry data despite only having received a subset thereof. This enables server 150 to monitor the entirety of the systems without having to receive the entire telemetry data set from controller 110 in each update.

Figure 5:
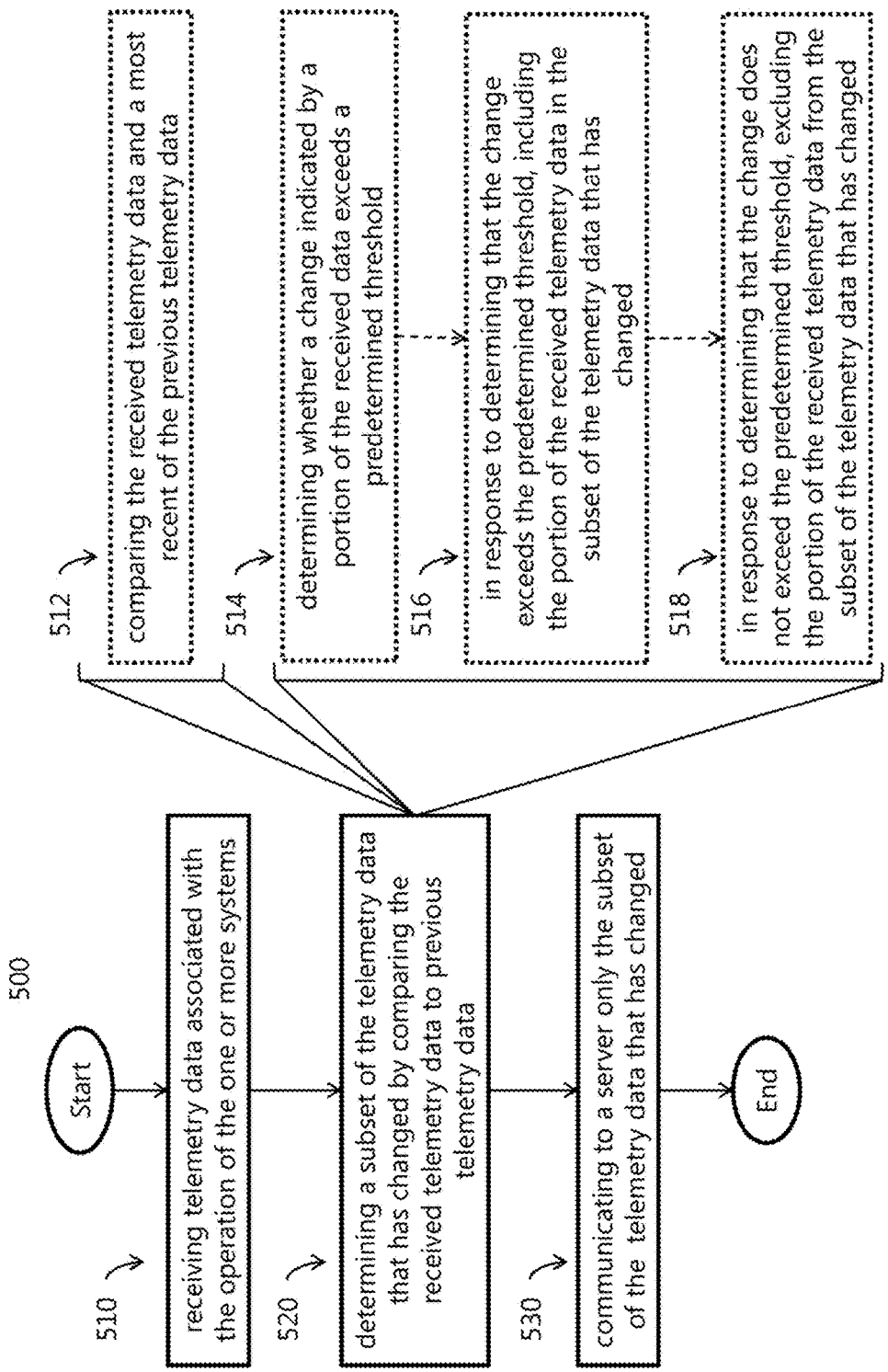
FIG. 5 is a flowchart diagram of an example method of using the example system, according to certain embodiments.

FIG. 5 is a flowchart diagram of an example method 500 of using system 100, according to certain embodiments. In particular embodiments, various components of system 100 perform the steps of method 500. Method 500 may begin at step 510, wherein telemetry data associated with the operation of one or more systems, such as system 100, is received. The received telemetry data may include not only basic telemetry data, such as the simple telemetry data in basic telemetry data 310, but also additional telemetry data, such as the more robust and detailed telemetry data in enhanced telemetry data 320. The one or more systems may include one or more different systems, including one or more of HVAC systems 120, refrigeration systems 130, and/or automation equipment 140.

At step 520, a subset of the telemetry data that has changed may be determined by comparing the received telemetry data to previous telemetry data. For example, controller 110 may compare individual values of the received telemetry data to determine if there are changes compared to the previous telemetry data values. In certain embodiments, the received telemetry data includes data associated with individual components of the one or more systems.

After determining the subset of telemetry data, method 500 may move to step 530, in which only the subset of telemetry data is communicated to a server, such as server 150. In this manner, server 150 may only receive the necessary telemetry data to determine the operation and status of the one or more systems.

Modifications, additions, or omissions may be made to method 500 depicted in FIG. 5. Method 500 may include more, fewer, or other steps. In one example, method 500 may further include optional step 512 during step 520. In optional step 512, the received telemetry data may be compared to a most recent of the previous telemetry data. In this manner, the subset of telemetry data may reflect only the most recent of changes in telemetry data.

In another example, method 500 may include optional subsets 514, 516, and 518. After receive telemetry data in step 510, at step 514, a change indicated by the received data may be determined to have exceeded or not to have exceed a predetermined threshold. After this determination, at step 516, if the change exceeds the threshold, the changed data is included in the subset of telemetry data. If, on the other hand, the change does not exceed the threshold, then, at step 518, the changed data is excluded from the subset of telemetry data.

Additionally, steps may be performed in parallel or in any suitable order. While discussed as various components of system 100 performing the steps, any suitable component or combination of components of system 200 may perform one or more steps of the method.

Certain embodiments may provide one or more technical advantages. For example, certain embodiments may reduce the amount of telemetry data communicated by only communicating telemetry data that has changed. In this manner, less bandwidth is needed and additional telemetry data values may be monitored and communicated, which may enhance the monitoring and control of various individual systems from a centralized location. As another example, certain embodiments may receive the telemetry data that includes data associated with individual components of one or more HVAC, refrigeration, and/or automation systems. This increased transparency into these systems may enhance the type of analysis and control of each individual type of system and the combination of telemetry data across different types of systems may allow for synergistic analysis and control of the different systems. As yet another example, certain embodiments may further reduce the amount of telemetry data communicated by only communicating changes in the telemetry data that are above a predetermined threshold. In this manner, only impactful changes may be communicated and normal variations are excluded.

Certain embodiments may include none, some, or all of the above technical advantages. One or more other technical advantages may be readily apparent to one skilled in the art from the figures, descriptions, and claims included herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   one or more systems comprising one or more heating, ventilation, and air conditioning (HVAC) systems and at least one refrigeration system or building automation system;
   a controller communicatively coupled to the one or more systems; and
   a server communicatively coupled to the controller;
   wherein the controller is configured to:
   receive telemetry data associated with operation of the one or more systems, wherein the received telemetry data comprises data associated with internal operation of individual components of the one or more systems, wherein, for each system of the one or more systems, the telemetry data is received according to a protocol used by that system; and determine a subset of the telemetry data that has changed by comparing the received telemetry data to previous telemetry data, wherein the received telemetry data and the previous telemetry data comprises one or more parameters and, for at least one given parameter of the one or more parameters, to determine whether to include the at least one given parameter in the subset of the telemetry data, the controller is configured to:
monitor a frequency with which the at least one given parameter demonstrates a change that persists for at least a minimum amount of time;
determine a reporting frequency for reporting the at least one given parameter to the server, the reporting frequency determined based on the frequency with which the at least one given parameter demonstrates the change that persists for at least the minimum amount of time;
set a timer based on the reporting frequency;
in response to expiry of the timer, trigger inclusion of the at least one given parameter in the subset of telemetry data if the at least one given parameter has changed compared to when the at least one given parameter was last reported to the server; and
adjust the timer in response to a determination to change the reporting frequency;
wherein the controller is further configured to communicate to the server only the subset of the telemetry data that has changed, the subset of the telemetry data communicated to the server according to a protocol that is used by the server and is different than the protocols used to receive the telemetry data from each system of the one or more systems.

2. The system of claim 1, wherein to communicate the subset of the telemetry data to the server, the controller is further configured to communicate at least a portion of the subset of the telemetry data in a form of a delta representing a difference between the previous telemetry data and the received telemetry data.

3. The system of claim 1, wherein to communicate the subset of the telemetry data, the controller is further configured to communicate at least a portion of the subset of the telemetry data in a form of an actual value of the received telemetry data.

4. The system of claim 1, wherein the controller is further configured to:
determine whether a change indicated by a portion of the received telemetry data exceeds a predetermined threshold;
in response to determining that the change exceeds the predetermined threshold, include the portion of the received telemetry data in the subset of the telemetry data that has changed;
in response to determining that the change does not exceed the predetermined threshold, exclude the portion of the received telemetry data from the subset of the telemetry data that has changed.

5. The system of claim 1, wherein to determine the subset of the telemetry data that has changed, the controller is further configured to compare the received telemetry data and a most recent of the previous telemetry data.

6. The system of claim 1, wherein the controller is further configured to determine to change the reporting frequency of the at least one given parameter based on a current traffic load on the server or network.

7. The system of claim 1, wherein the controller is further configured to determine to change the reporting frequency of the at least one given parameter based on an importance of the given parameter during a particular time period.

8. The system of claim 1, wherein, for each parameter of the one or more parameters, the controller is further configured to:
determine whether a value of the parameter has been previously reported to the server within a predetermined period of time;
determine whether a change in the value of the parameter compared to a value of the parameter in the previous telemetry data has persisted for at least the minimum amount of time; and
include the parameter in the subset of the telemetry data in response to determining that the value of the parameter has not been previously reported to the server within the predetermined period of time and that the change in the value of the parameter has persisted for at least the minimum amount of time.

9. A controller configured to:
communicatively couple to one or more systems, at least one of the one or more systems comprising a heating, ventilation, and air conditioning (HVAC) system and at least one refrigeration system or building automation system;
receive telemetry data associated with operation of the one or more systems, wherein, for each system of the one or more systems, the telemetry data is received according to a protocol used by that system; and
determine a subset of the telemetry data that has changed by comparing the received telemetry data to previous telemetry data, wherein the received telemetry data and the previous telemetry data comprises one or more parameters and, for at least one given parameter of the one or more parameters, to determine whether to include the at least one given parameter in the subset of the telemetry data, the controller is configured to:
monitor a frequency with which the at least one given parameter demonstrates a change that persists for at least a minimum amount of time;
determine a reporting frequency for reporting the at least one given parameter to a server, the reporting frequency determined based on the frequency with which the at least one given parameter demonstrates the change that persists for at least the minimum amount of time;
set a timer based on the reporting frequency;
in response to expiry of the timer, trigger inclusion of the at least one given parameter in the subset of telemetry data if the at least one given parameter has changed compared to when the at least one given parameter was last reported to the server; and
adjust the timer in response to a determination to change the reporting frequency;
wherein the controller is further configured to communicate to the server only the subset of the telemetry data that has changed, the subset of telemetry data communicated to the server according to a protocol that is used by the server and is different than the protocols used to receive the telemetry data from each system of the one or more systems.

10. The controller of claim 9, wherein the received telemetry data comprises data associated with individual components of the one or more systems.

11. The controller of claim 9, wherein to communicate the subset of the telemetry data to the server, the controller is further configured to communicate at least a portion of the subset of the telemetry data in a form of a delta representing a difference between the previous telemetry data and the received telemetry data.

12. The controller of claim 9, wherein to communicate the subset of the telemetry data, the controller is further configured to communicate at least a portion of the subset of the telemetry data in a form of an actual value of the received telemetry data.

13. The controller of claim 9, wherein the controller is further configured to;
  determine whether a change indicated by a portion of the received telemetry data exceeds a predetermined threshold;
  in response to determining that the change exceeds the predetermined threshold, include the portion of the received telemetry data in the subset of the telemetry data that has changed;
  in response to determining that the change does not exceed the predetermined threshold, exclude the portion of the received telemetry data from the subset of the telemetry data that has changed.

14. The controller of claim 9, wherein to determine the subset of the telemetry data that has changed, the controller is further configured to compare the received telemetry data and a most recent of the previous telemetry data.

15. A method, comprising:
  receiving telemetry data associated with operation of one or more systems, wherein, for each system of the one or more systems, the telemetry data is received according to a protocol used by that system and wherein at least one of the one or more systems comprises a heating, ventilation, and air conditioning (HVAC) system and at least one refrigeration system or building automation system; and
  determining a subset of the telemetry data that has changed by comparing the received telemetry data to previous telemetry data, wherein the received telemetry data and the previous telemetry data comprises one or more parameters and, for at least one given parameter of the one or more parameters, determining whether to include the at least one given parameter in the subset of the telemetry data comprises:
    monitoring a frequency with which the at least one given parameter demonstrates a change that persists for at least a minimum amount of time;
    determining a reporting frequency for reporting the at least one given parameter to a server, the reporting frequency determined based on the frequency with which the at least one given parameter demonstrates the change that persists for at least the minimum amount of time;
    setting a timer based on the reporting frequency;
    in response to expiry of the timer, triggering inclusion of the at least one given parameter in the subset of telemetry data if the at least one given parameter has changed compared to when the at least one given parameter was last reported to the server;
    adjusting the timer in response to a determination to change the reporting frequency;
  wherein the method further comprises communicating to the server only the subset of the telemetry data that changed, the subset of telemetry data communicated to the server according to a protocol that is used by the server and is different than the protocols used to receive the telemetry data from each system of the one or more systems.

16. The method of claim 15, wherein the received telemetry data comprises data associated with individual components of the one or more systems.

17. The method of claim 15, wherein communicating the subset of the telemetry data to the server comprises communicating at least a portion of the subset of the telemetry data in a form of a delta representing a difference between the previous telemetry data and the received telemetry data.

18. The method of claim 15, wherein communicating the subset of the telemetry data to the server comprises communicating at least a portion of the subset of the telemetry data in a form of an actual value of the received telemetry data.

19. The method of claim 15, further comprising:
  determining whether a change indicated by a portion of the received telemetry data exceeds a predetermined threshold;
  in response to determining that the change exceeds the predetermined threshold, including the portion of the received telemetry data in the subset of the telemetry data that has changed;
  in response to determining that the change does not exceed the predetermined threshold, excluding the portion of the received telemetry data from the subset of the telemetry data that has changed.

20. The method of claim 15, wherein determining the subset of the telemetry data that has changed comprises comparing the received telemetry data and a most recent of the previous telemetry data.

* * * * *